(12) United States Patent
Daynès et al.

(10) Patent No.: US 8,250,559 B2
(45) Date of Patent: Aug. 21, 2012

(54) SUPPORTING PER-PROGRAM CLASSPATHS WITH CLASS SHARING IN A MULTI-TASKING VIRTUAL MACHINE

(75) Inventors: Laurent P. Daynès, Saint-Ismier (FR); Grzegorz J. Czajkowski, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1648 days.

(21) Appl. No.: 11/403,076

(22) Filed: Apr. 12, 2006

(65) Prior Publication Data

US 2007/0245331 A1   Oct. 18, 2007

(51) Int. Cl.
  *G06F 9/44* (2006.01)
  *G06F 9/45* (2006.01)
  *G06F 9/455* (2006.01)

(52) U.S. Cl. ............. 717/166; 717/118; 717/139; 718/1

(58) Field of Classification Search .................... 717/166
See application file for complete search history.

(56) References Cited

U.S. PATENT DOCUMENTS

| | | | |
|---|---|---|---|
| 5,692,047 A | 11/1997 | McManis | |
| 5,740,441 A | 4/1998 | Yellin et al. | |
| 5,815,718 A | 9/1998 | Tock | |
| 5,893,118 A | 4/1999 | Sonderegger | |
| 5,966,702 A | 10/1999 | Fresko et al. | |
| 6,339,841 B1 | 1/2002 | Merrick et al. | |
| 6,349,344 B1 | 2/2002 | Sauntry et al. | |
| 6,430,569 B1 * | 8/2002 | Bracha et al. ....................... 1/1 |
| 6,470,494 B1 | 10/2002 | Chan | |
| 6,567,974 B1 * | 5/2003 | Czajkowski ................. 717/151 |
| 6,738,977 B1 * | 5/2004 | Berry et al. .................... 719/332 |
| 6,799,173 B2 * | 9/2004 | Czajkowski et al. ......... 711/147 |
| 6,807,664 B1 * | 10/2004 | Ohi ................................ 717/164 |
| 6,851,114 B1 * | 2/2005 | Czajkowski ................... 719/315 |
| 6,931,544 B1 * | 8/2005 | Kienhofer et al. ........... 717/118 |
| 6,931,638 B2 * | 8/2005 | Daynes et al. ................... 718/1 |
| 7,003,768 B2 * | 2/2006 | Daynes et al. ................... 718/1 |
| 7,065,755 B2 * | 6/2006 | Daynes et al. ............... 717/148 |

(Continued)

OTHER PUBLICATIONS

Multitasking without Compromise: a Virtual Machine Evolution Grzegorz Czajkowski Laurent Daynès Proceedings of the 2001 ACM SIGPLAN Conference on Object Oriented Programming, Systems, Languages and Applications Year of Publication: 2001, pp. 125-138.*

(Continued)

*Primary Examiner* — Emerson Puente
*Assistant Examiner* — Paul Mills
(74) *Attorney, Agent, or Firm* — Robert C. Kowert; Meyertons, Hood, Kivlin, Kowert 7 Goetzel, P.C.

(57) ABSTRACT

System and method for supporting per-program classpath and class sharing in a multi-tasking virtual machine. A virtual machine may allow each program to specify its classpath independently of other programs classpaths. Tasks that specify identical classpaths for their respective class loaders may share the runtime representation of classes. A multi-tasking virtual machine may generate and compare canonical forms of classpaths to determine which programs may share classes with each other. The runtime representation of a class may be split between shared and private portions of the runtime representation. A shared runtime representation may be associated with multiple private runtime representations. In one embodiment, unique class loader keys and a system dictionary may be used to associate tasks, class loaders and the shared representations of classes.

20 Claims, 7 Drawing Sheets

U.S. PATENT DOCUMENTS

| | | | |
|---|---|---|---|
| 7,082,600 B1 * | 7/2006 | Rau et al. | 717/148 |
| 7,406,687 B1 * | 7/2008 | Daynes et al. | 717/166 |
| 7,644,402 B1 * | 1/2010 | Daynes et al. | 717/166 |
| 2004/0015921 A1 | 1/2004 | Daynes | |
| 2005/0060698 A1 | 3/2005 | Doykin | |
| 2005/0155028 A1 | 7/2005 | Park | |
| 2006/0070051 A1 | 3/2006 | Kuck et al. | |
| 2007/0061796 A1 * | 3/2007 | Atsatt | 717/166 |
| 2007/0061798 A1 * | 3/2007 | Atsatt | 717/166 |
| 2007/0169072 A1 * | 7/2007 | Corrie | 717/166 |

OTHER PUBLICATIONS

Java Class Separation for Multi-Application Hosting Stefan Peal, Reiner Kammüller, Bernd Freisleben Proceedings of the 3rd Conference on Internet Computing Year of Publication: 2002, pp. 259-266.*

Interaction of Virtual Machine with the Operating System Kiran Tati and Geoffrey Voelker University of California at San Diego La Jolla, CA, USA Year of Publication: 2002.*

U.S. Appl. No. 60/276,409 Grzegorz Czajkowski Laurent Daynès U.S. Appl. No. 10/043,801, filed Jan. 10, 2002, now U.S. Patent #6,931,638 Claims Priority from U.S. Appl. No. 60/276,409, filed Mar. 15, 2001 Available to public: Sep. 19, 2002 upon publication of 2002/0133638.*

Scaling J2EE™ Application Servers with the Multi-Tasking Virtual Machine Mick Jordan, Laurent Daynès, Grzegorz Czajkowski, Marcin Jarzab, and Ciarán Bryce Sun Microsystems SMLI TR-2004-135 Jun. 2004.*

Dynamically Loaded Classes as Shared Libraries: an Approach to Improving Virtual Machine Scalability Grzegorz Czajkowski and Laurent Daynès Parallel and Distributed Processing Symposium Apr. 2003.*

Code Sharing among Virtual Machines Grzegorz Czajkowski and Laurent Daynès ECOOP '02 Proceedings of the 16th European Conference on Object-Oriented Programming Year of publication 2002 pp. 155-177.*

"Sharing the Runtime Representation of Classes Across Class Loaders"; Laurent Daynes and Grzegorz Czajkowski; Sun Microsystem Laboratories; 2005, pp. 1-24.

* cited by examiner

FIG. 4 system loader table 590

SUPPORTING PER-PROGRAM CLASSPATHS WITH CLASS SHARING IN A MULTI-TASKING VIRTUAL MACHINE

BACKGROUND OF THE INVENTION

1. Field of the Invention

This invention relates generally to multi-tasking virtual machines and more particularly to supporting per-program classpaths with class sharing in a multi-tasking virtual machine.

2. Description of the Related Art

Modern programming object-oriented languages (like C# or the Java programming language) are typically compiled into an architecture neutral binary format specific to a managed runtime environment (MRE). The Java Virtual Machine (JVM) and .NET exemplify two popular MREs.

MREs typically load an architecture neutral binary image of a program (on-demand and on a per-class basis) and transform these class images at runtime into native representations optimized for the platform where the MRE runs. Such runtime transformations of programs enhance mobility and program portability, but can result in poor memory usage and slow program startup when compared to more conventional programming language runtime architectures.

Both problems originate, to a large extent, from a lack of sharing of the runtime representation of classes across running programs: a substantial amount of program execution is spent loading, verifying and transforming the binary image of classes into platform-dependent native code. The result of these transformations is typically no re-used across serial or simultaneous program executions, resulting in duplication of effort (code transformation, runtime compilation) and memory waste.

Class loaders are a mechanism for dynamically loading software components, such as classes, in a program. Classes are distributed using an architecturally neutral binary representation generally referred to as a class file. Each class may be represented by a single class file, such as may be produced by a Java compiler. Class files may be stored in actual file, in a memory buffer, or obtained from a network stream. In a program, a class type may be uniquely identified by a class name and a namespace. Thus, two classes with the same name may be defined in different namespaces and may be treated as different types. Even through two classes may have the same name, they may be defined in different class files and thus by complete unrelated functionally. Virtual machines frequently implement namespaces as class loaders. Class loaders are generally used by virtual machines to obtain the class files necessary to create the class types needed by a program.

The primordial or boot loader is a build-in class loader used to load the base classes that are intimately associated with a JVM implementation and are essential to its functioning (such as classes of the java.lang.* packages). Every program has a boot loader. The boot loader always retrieves the binary representation of classes from the same location. Further, the boot loader never delegates the resolution of symbolic references. Thus, symbolic references from classes defined by the primordial loader always resolve to the same binary representations (which for a given installation of the JVM never change), and therefore, to the same runtime representations.

The extension and system loaders are two other built-in loaders. As with the boot loader, every program has a single instance of each. The extension loader defines extension classes, i.e. classes that use the Java Extension mechanism. These are frequently bundled as .jar files located in the extensions directory. Extension loaders generally systematically delegate class definition to the boot loader and only attempts to define classes that the boot loader failed to define. In this case, the extension loader searches a class definition in the extension directory. This behavior is predictable and symbolic references from classes defined by the extension loaders always resolve identically for different tasks if the content of the extension directory seen by these tasks is the same (i.e. the same jar files).

The system loader is the default loader that defines classes of user programs. A user-specified classpath is used to locate program classes. The classpath specifies a list of directories, JAR archives, and ZIP archives that contain class files. The behavior of the system loader is generally controlled by the JVM and predictable for a given class path. The system loader always delegates the definition of a class to the extension loader and only attempts to define the class if the extension loader has failed to do so. In this case, the system loader searches for a definition of the class in the sources listed in the classpath.

Managed runtime environments (MREs) generally don't support code sharing well (in particular, sharing of the runtime representation of classes), which frequently results in poor startup performance and large memory footprint of programs. Solutions that have been proposed to share the runtime representation of classes across programs to minimize this problem are generally limited to classes bundled with the MRE itself (e.g. core classes that are part of the standard library of the Java platform).

SUMMARY

Per-Program Classpath with Class Sharing may allow a multi-taking virtual machine (such as a JVM) to exploit code and class sharing while allowing each program to specify its respective classpath independently of other programs' classpaths. A multi-tasking virtual machine may, in one embodiment, configure shared runtime representations of classes for sharing among tasks that specify identical classpaths. If two (or more) tasks or programs executing in the virtual machine specify identical classpaths for their respective class loaders, a multi-tasking virtual machine may be configured to support sharing of runtime representations of the classes loaded by those tasks. In one embodiment a multi-tasking virtual machine may generate canonical versions of two tasks' respective classpaths and may compare the canonical forms of the classpaths to determine whether the two tasks specify identical classpaths. If two tasks' classpaths are identical and both tasks utilize the built-in class loaders, those class loaders may behave identically with respect to locating and loading classes for the two tasks, according to some embodiments. If two tasks do not specify identical classpaths, they may not be able to safely share runtime representations of classes.

In some embodiments, a multi-tasking virtual machine may split the runtime representation of a class into a shared runtime representation (SRR) and a private runtime representation (PRR). The shared runtime representation may store those portions of a class representation that may safely be shared among tasks, such as the method bytecodes, and the description of class fields, etc. and the private runtime representation may store those portions that cannot be safely shared among different programs, such as static variables. Each shared runtime representation may be associated with multiple private runtime representations and a multi-tasking virtual machine may maintain a system dictionary that maps classes with their shared runtime representations and with the group of tasks that may share each particular shared runtime representation, according to some embodiment.

Sharing of runtime representations of classes and supported per-program classpaths may, in some embodiments, improve memory usage and performance in multi-tasking virtual machines, as well as reduce the footprint of programs sharing the runtime representations of classes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
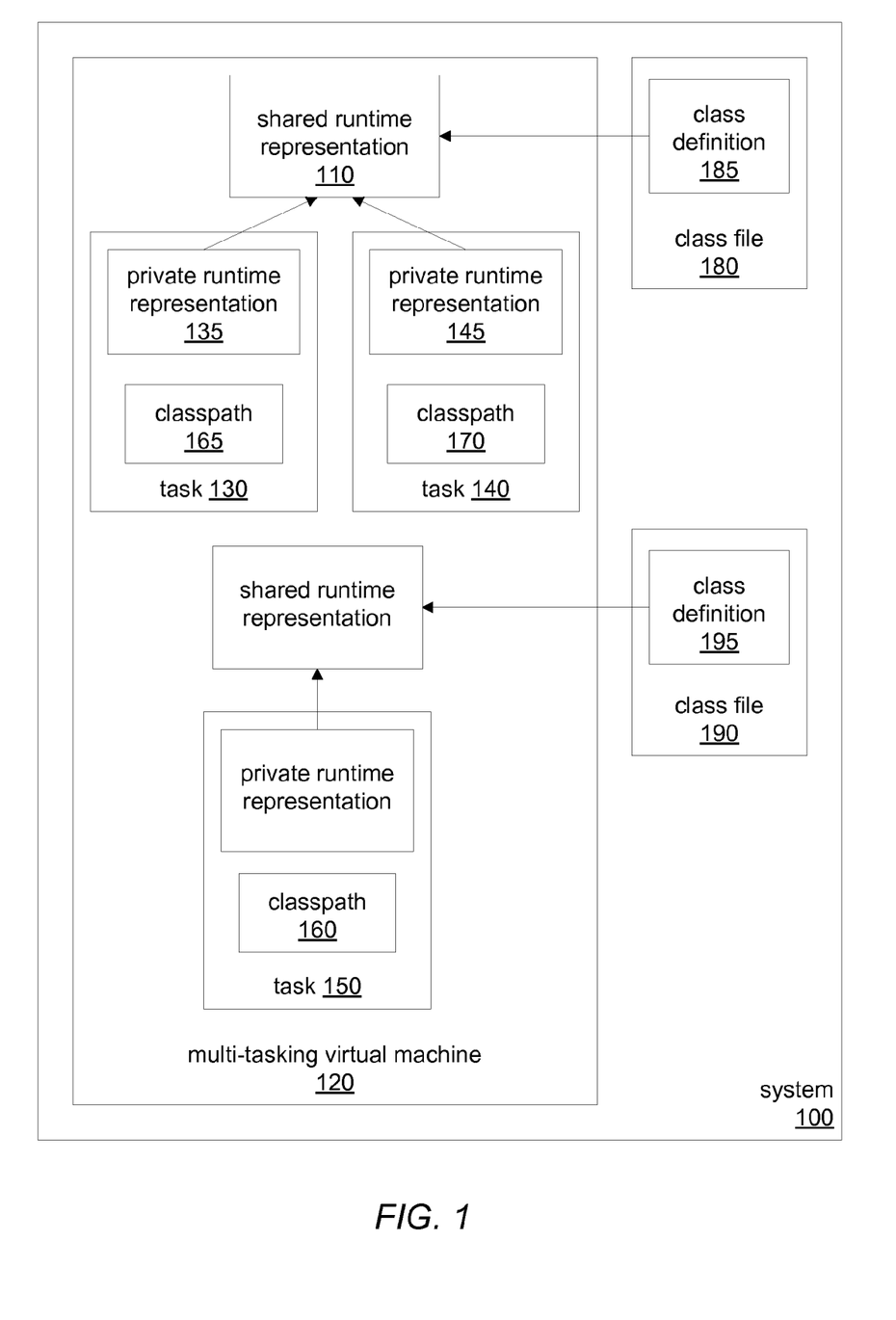
FIG. 1 is a block diagram illustrating a multi-tasking virtual machine configured to support per-program classpaths and sharing of runtime representations of classes, according to one embodiment.

A multi-tasking virtual machine may support both shared runtime representation of classes and per-class classpaths, as described herein and illustrated by FIG. 1. FIG. 1 is a block diagram illustrating an exemplary system including a multi-tasking virtual machine configured to support per-program classpaths and sharing of runtime representation of classes, according to one embodiment. In FIG. 1, system 100 may include multi-tasking virtual machine 120 that may be configured to execute programs, such as JAVA based programs. Virtual machine 120 may also be configured to load architecture neutral binary images of classes on a per-class, on demand, basis and to transform the architecture neutral images of the classes into native runtime representations of the classes. Thus, in one embodiment, virtual machine 120 may load the class definition 185 from class file 180 and transform the architecture neutral image from class definition 185 into a runtime representation including both shared runtime representation 110 one or both private runtime representations 135 and 145. As noted above, while some portions of a class may be shared among multiple tasks or programs, certain portions, such as static variables, may not be shared across multiple tasks or programs. Thus, virtual machine 120 may be configured to generate two separate portions of a runtime representation of a class, such as shared runtime representation 110 and private runtime representation 135.

In the example embodiment illustrated by FIG. 1, virtual machine 120 may have executed tasks 130, 140 and 150 and each task may have initiated an instance of a class. For example, tasks 130 and 140 may each have initiated an instance of a class from class definition 185 while task 150 may have initiated an instance of a class from class definition 195 from class file 190. Additionally, virtual machine 120 may have determined that tasks 130 and 140 may share runtime implementations of classes because both tasks may have specified identical or equal classpaths to locate and load classes.

Every program or task executing in a virtual machine may specify a classpath including locations (such as directories, JAR files, ZIP or other archive files) to be used when locating a particular class definition to load. For instance, task 130 may specify classpath 165, task 140 may specify classpath 170 and task 150 may specify classpath 160. While FIG. 1 illustrates the classpaths as being a part of the respective tasks, the actual memory image of a classpath may be stored by virtual machine 120 separately from any other memory representation of the task specifying the classpath. For instance, in one embodiment, virtual machine 120 may store all classpaths together in a single data structure and associate each classpath with the task that specified it. In another embodiment, however virtual machine 120 may store a classpath as part of a class loader object instance for the task. In other embodiments, classpaths may be stored in yet other manners. Additionally, as noted above, a virtual machine may support a hierarchy of different class loaders for each executing task or program. For example, virtual machine 120 may implement a boot loader for loading core classes, an extension loader for loading extension classes and a system or application loader for loading all other classes. In one embodiment, virtual machine 120 may implement instances of all three types of class loaders for each executed task or program. In another embodiment, all executing tasks may share a single instance of a boot loader while having separate, individual instances of extension and system loaders. Furthermore, virtual machine 120 may also support application or program specific class loaders over which the virtual machine may have little or no control, according to some embodiments. In some embodiments, virtual machine 120 may not support the sharing of runtime representations of classes located and loaded via application-specific, custom class loaders.

Virtual machine 120 may only allow tasks to share runtime representations of classes if those tasks specify identical or equal classpaths, thus ensuring that the classes specified by the tasks are identical. Please note it is generally not sufficient to allow sharing of a runtime representation of classes that have the same classname but that were loaded from two different class files or class definitions, as the two class definitions may be quite different even though they use the same class name. Thus, in some embodiments, virtual machine 120 may verify that the classpaths of two different tasks are identical before allowing those tasks to share runtime representations of classes.

As mentioned above, in some embodiments, a virtual machine may only allow tasks to share runtime representations of classes if the classpaths specified by those tasks are identical. In some embodiments, a virtual machine may compare the classpaths as specified to determine whether they are the same or not. However, in some embodiments, the locations (or directories) of classpath may be evaluated according to the current directory of the program or task. For instance, a classpath may include a directory of "../classes". Depending on the current directory of the program specifying the classpath, "../classes" may actually point to a "/development/classes" directory or to a "/users/jdoe/code/classes" directory. Thus, in some embodiments, virtual machine 120 may first convert classpaths into a canonical form before comparison. When determining or computing a canonical form of a classpath, virtual machine 120 may resolve all portions of a classpath including symbol links or references (such as "./" and "../", or other system defined aliases) and may also remove any duplicate or redundant directories or locations. A classpath may include the same location or directory twice either exactly or via equivalent symbolic links. For example, a classpath by specify both "/users/jdoe/code/classes" and "../classes", which may expand to "/users/jdoe/code/classes" when "../" is resolved using the relevant programs' current directory. Thus, in some embodiments, virtual machine 120 may convert classpaths into canonical form before comparison.

A canonical classpath may be considered a classpath composed of an absolute path to elements and that is stripped of redundant path elements. For instance, consider the following three paths:

1. ./classes:/usr/lang/JAVA/lib/ant.jar:/usr/lang/JAVA/lib/regex.jar
2. ../tests/classes:/usr/lang/JAVA/lib/ant.jar:/usr/lang/JAVA/lib/regex.jar
3. /space/tests/classes:../lib/ant.jar:../lib/regex.jar:../lib/ant.jar Classpath 1 may be defined relative to a directory /space/tests, classpath 2 may be defined relative to a directory that is a sub-directory of /space/tests, and classpath 3 may be defined relative to a sub-directory of /usr/lang/JAVA. Although in their textual form all three classpaths may appear different, their canonical form may be identical: /space/tests/classes:/usr/lang/JAVA/lib/ant.jar:/usr/lang/JAVA/lib/regex.jar.
Please note, the last occurrence of ../lib/ant.jar in classpath 3 is redundant with the first one and removing the last occurrence would not change the result of locating up a class definition. Two tasks may be considered to behave identically with regard to locating class definitions if the canonical forms of their respective classpaths are identical. Thus, if the three classpaths in the example above were each used by a separate task, those tasks may be said to behave identically with respect to locating class definitions. In some embodiments, this condition may be efficiently evaluated. For instance, it may only require computing canonical forms of classpaths and performing string comparisons to determine whether the canonical forms for different tasks are identical. In some embodiments, pointer comparison may be used when the strings holding the canonical forms are Java interned strings. In Java, interned strings share a single copy of the string rather than each string maintaining its own copy of the string in its own respective block of memory. Comparing the canonical forms of classpaths may be considered conservative since it may only capture a subset of cases of identical behavior. For instance, it is possible that the canonical path of a system loader is a prefix of the canonical path of another system loader. In such a case, the class loader behavior would be identical for classes defined from class files of the prefix, and it is possible to share the runtime representation of classes between the task reentrant loaders of two tasks such that one uses a canonical classpath and the other uses a prefix of it.

Tasks whose hierarchy of VM-defined class loaders behave identically with respect to the resolving of symbolic references can exploit task-reentrance to share the runtime representation of their classes, as described herein.

A virtual machine, such as virtual machine 120, may utilize one or more operating system or utility functions, operations, or directives when computing the canonical form of a classpath. For example, in one embodiment virtual machine 120 may use the Java getCanonicalFile( ) function to obtain the canonical form for each directory listed in a classpath and then concatenate the various canonical paths into a single, canonical classpath. Please note that use of the function getCanonicalFile represents only one potential method, according to one embodiment, for obtaining or computing a canonical classpath. The exact method and functions used to determine the canonical form of a classpath may vary from embodiment to embodiment.

If the canonical forms of two classpaths are identical, that is if they each include exactly the same directories, virtual machine 120 may cause the tasks specifying those classpaths to share the runtime representations of classes. Thus, if the canonical forms of classpaths 165 and 170 are identical, virtual machine 120 may generate shared runtime representation 110 of a class loaded by both task 130 and 140.

In some embodiments, tasks may be associated with a class loader key if their virtual machine defined class loaders (such as the primordial, extension and system class loaders) behave identically with respect to locating a class file. A virtual machine may decide whether loaders behave identically by computing and comparing canonical forms of the classpaths used to locate classes. If the two canonical forms are the same, the two tasks may share the runtime representation of classes. In some embodiments, a runtime representation of classes defined by VM-defined loaders may be structured in three components: a shared runtime representation, a task-table, and a private runtime representation. The private runtime representation may encapsulate the task-specific part of the runtime representation, such as static variables and the like.

In some embodiments, a multi-tasking virtual machine may associate tasks that have identical canonical classpaths with the same class loader key. A class loader key may be any unique identifier used to associate tasks that may share runtime representations of classes and their respective class loaders in a group. In one embodiment a class loader key may be constructed from the canonical form of the classpath associated with a particular class loader. Additionally, a class loader key for an system class loader may be constructed from the canonical forms of the classpaths associated with both the system class loader and the particular extension class loader to which the system class loader delegates class loading. A virtual machine may maintain multiple groupings, each indicating multiple tasks (and their respective class loader instances) that use identical class paths and thus may share the runtime representation of classes. In other embodiments however, a multi-tasking virtual machine may use another method or mechanism to determine and maintain which tasks and class loaders may share runtime representations of classes.

Task-reentrant class loaders with identical behavior that share the runtime representation of the classes they loaded and defined may be associated with the same class loader key. Class loader keys may be used by the dynamic linking mechanisms of a multi-tasking virtual machine to resolve symbolic reference to classes. Specifically, a multi-tasking virtual machine may keep track of the runtime representation of defined classes in a system dictionary. A system dictionary that maps pairs of class loader keys and class name to a shared runtime representation of the class. Symbolic reference resolutions may use the class loader key of the current class to query the system dictionary. In some embodiments, a key composed of a class loader key and a class name may uniquely identify each entry of the system dictionary.

The behavior of virtual machine defined class loaders (primordial, extension and system) may depend solely on the source that each loader of the virtual machine defined part of the loader hierarchy uses for searching a class file definition for a given class name. Thus, if the virtual machine defined loaders to two different tasks use the same source and if the contents of the source don't change, the virtual machine defined loaders will behave identically and predictably.

A multi-tasking VM may assign a task identifier to each task it executes and all threads may maintain the identifier of their task in a location that can be quickly retrieved, according to some embodiments. In one embodiment, a task identifier may be a small integer value that identifies an entry in the various tables of per-task data structures that may be maintained by the multi-tasking virtual machine. Thus, in some embodiments, access to a per-task data structure within a virtual machine for a given task may involve indexing the right table with the task identifier of the current thread. In other embodiments, however, a different method of accessing per-task data may be utilized and the method of accessing per-task data within a multi-tasking virtual machine may vary from embodiment to embodiment.

Task-reentrant class loaders that behave identically may be said to always resolve a class with the same name to the same class definition. This allows for a simplified form of sharing where only the program-visible mutable state part of the runtime representation of a class (e.g. static variables, class initialization state, protection domain, instance of java.lang.Class, etc) needs to be replicated per class loader. In particular, information derived from resolved symbolic links, such-as field offsets, virtual table indexes, static method addresses, etc., may be shared across loaders, further increasing the amount of sharing, according to some embodiments.

Please note that the term virtual machine, as used herein, refers to a multi-tasking virtual machine (MVM) such as a multi-tasking Java Virtual Machine (JVM) unless specifically stated otherwise. Additionally where the figures and description herein describe a class loader and method and functionality of a class loader, it should be noted that the details, methods and functionality of a described class loader refer and apply to one or more of a boot loader, an extension loader or a system (or application) loader. Also, the terms task and program are used interchangeably herein.

Figure 2:
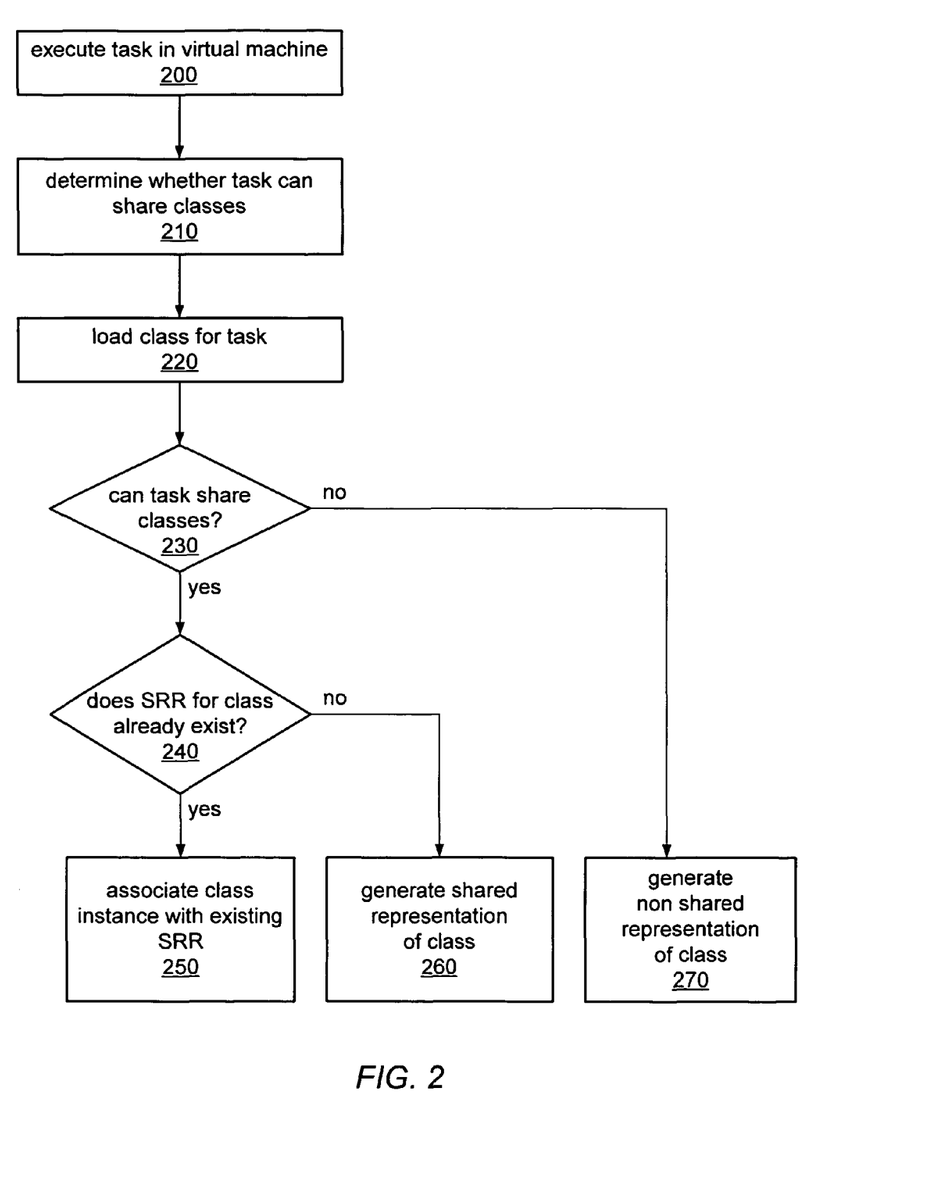
FIG. 2 is a flowchart illustrating one embodiment of a method for supported per-program classpaths and sharing of runtime representations of classes.

As described above, a multi-tasking virtual machine may execute various tasks and may be configured to support per-program classpaths and the sharing of runtime representations of classes. FIG. 2 is a flowchart illustrating one embodiment of a method for supporting per-program classpaths and sharing of runtime representations of classes, as described herein. A multi-tasking virtual machine, such as virtual machine 120, described above, may execute one or more tasks, as indicated by block 200. In order to support program specific classpaths and share classes among tasks, virtual machine 120 may be configured to determine whether a specific task can share classes with other classes, as illustrated by block 210. As described above, in some embodiments, a virtual machine may compare the classpaths of the executing tasks to determine whether or not, and which, tasks may share runtime representations of classes. For instance, if two tasks or programs specify identical classpaths for the same virtual machine defined class loaders, the two tasks may share the runtime representation of any classes they both load with their virtual machine defined class loaders. Additionally, in some embodiments, any task that defines its own custom class loader may not be able to share any classes with any other tasks. Virtual machine 120 may record, store or maintain an indication of whether a task may share classes with other tasks in various ways, as will be described in more detail herein below with reference to FIG. 4.

Additionally, virtual machine 120 may associate tasks that may share classes with each other as a group and may maintain multiple such groups, according to some embodiments. For instance, in one embodiment, virtual machine 120 may associate all tasks that can share classes with each other with a unique identifier or key, such as a class loader key, described in more detail herein below regarding FIG. 5.

Virtual machine 120 may also load a class for the executing task, as illustrated by block 220. In general, a virtual machine may have to load a base class in order to begin execution of the task, such as by executing a static void main() function in some embodiments. Additionally, tasks or programs executing in virtual machines are frequently composed of many classes, each of which must be loaded by a class loader, as described above. The loading of class may include traversing a classpath to locate an architecture neutral definition of the class, such as may be generated by a Java compiler in some embodiments. The virtual machine (specifically a class loader associated with the class or associated with the class initiating the loading of the class) may then load the architecture neutral class definition and transform it into an architecture specific binary runtime representation of the class. As noted above, in some embodiments, a virtual machine may split the runtime representation of a class into a shared portion and a private portion. As noted above, the shared runtime representation (SRR) of a class may include those portions of a class that may be used by multiple programs without conflict. The private runtime representation (PRR) of a class may include those portions that cannot be used by multiple programs safely. For example, a single instance of a static member variable may not be safely used by more than one program because each program expects to store its own values in static member variables and one program may easily overwrite the values of another.

As noted above, a multi-tasking virtual machine, such as virtual machine 120 may determine whether a task can share runtime representations of classes with other task, as illustrated by block 210, described above. If a task cannot share classes, as indicated by the negative output of decision block 230, virtual machine 120 may, in some embodiments, generate a non sharable runtime representation of the class, as illustrated by block 270.

If the task can share classes, as indicated by the positive output of decision block 230, the virtual machine may then determine whether or not a shared runtime representation of the class already exists, as indicated by decision block 240. For example, in one embodiment, virtual machine 120 may include a dictionary that maintains an entry for each class loaded in the virtual machine that may indicate whether a shared runtime representation of a class was previously generated and loaded by the virtual machine. The use of such a dictionary is described in more detail below regarding FIGS.

Figure 5:
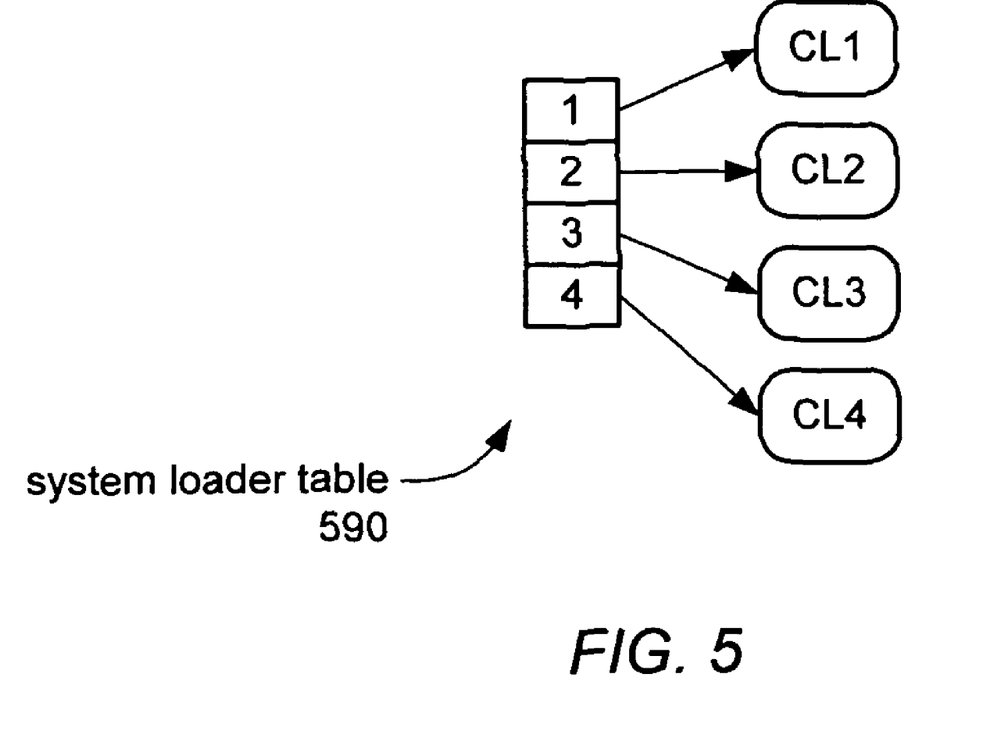
FIG. 5 is a block diagram illustrating an exemplary data structure, according to one embodiment, for associating tasks with class loaders as part of support for supporting per-program classpaths and the sharing of runtime representations of classes.
Figure 6:
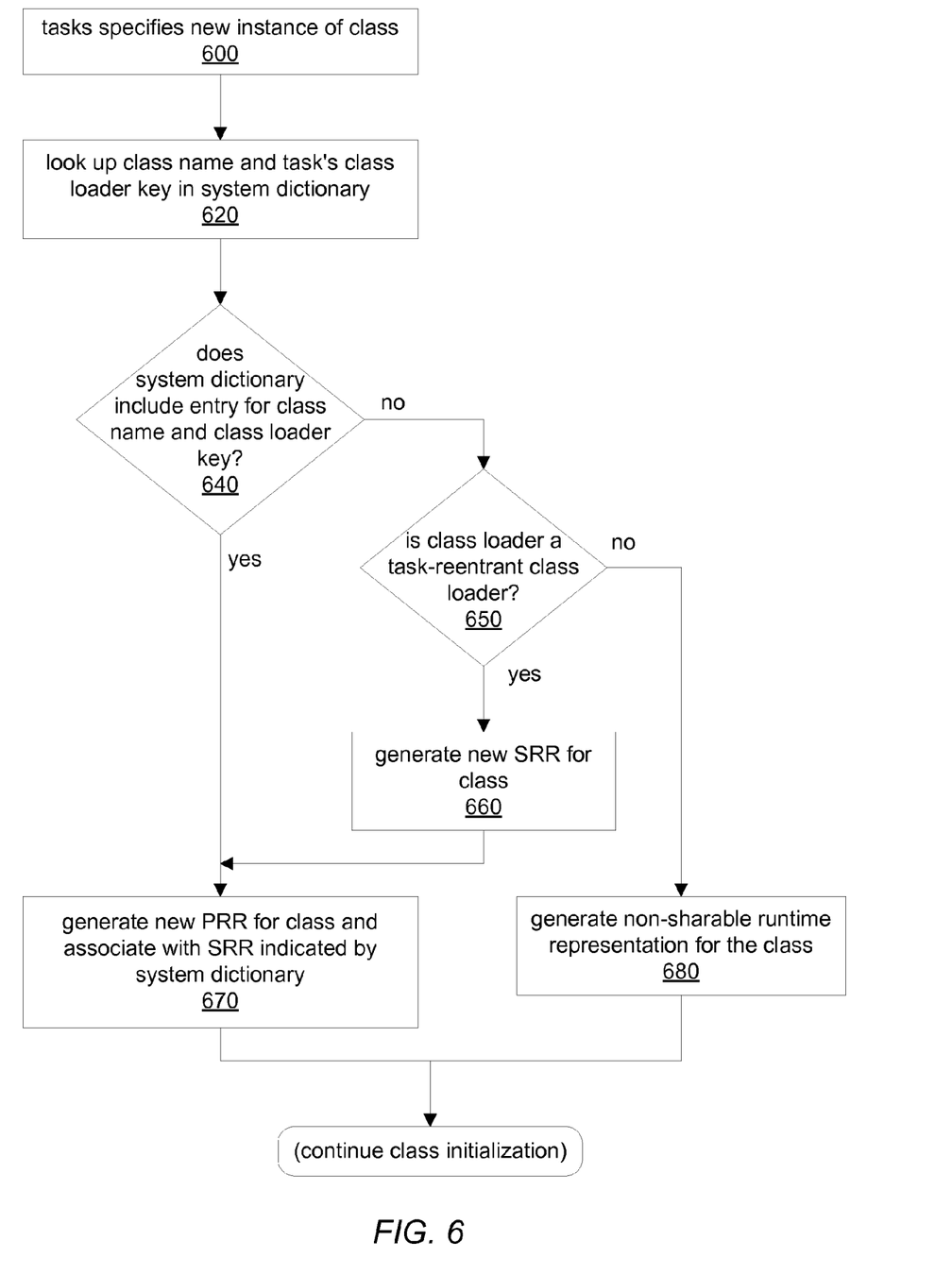
FIG. 6 is a flowchart illustrating one embodiment of a method for loading a class in a virtual machine supporting per-program classpaths and sharing of runtime representation of class.

5 and 6. In other embodiments virtual machine 120 may be configured to locate an existing shared runtime representation of a class in another manner.

If a shared runtime representation of the class does exist, as indicated by the positive output of decision block 240, virtual machine 120 may associate the new instance of the class and the task loading the class with the existing shared runtime representation of the class, as illustrated by block 250. In some embodiments, virtual machine 120 may also be configured to generate a private representation of those portions of the class that cannot be shared with other tasks. In some embodiments, virtual machine 120 may also be configured to update a dictionary or other data structure that maps or associates the loaded class with the existing shared runtime representation. Additionally, virtual machine 120 may be configured to update the shared runtime representation to indicate the new instance of the class associated with the existing shared runtime representation.

If a shared runtime representation of the class does not already exists, as indicated by the negative output of decision block 240, virtual machine 120 may be configured to generate a new shared runtime representation of the class, as illustrated by block 260. In some embodiments, virtual machine 120 may be configured to configure the new runtime representation of the class for sharing when first generated. While in other embodiments, virtual machine 120 may not configure the runtime representation for sharing until another task loads the same class.

Figure 3:
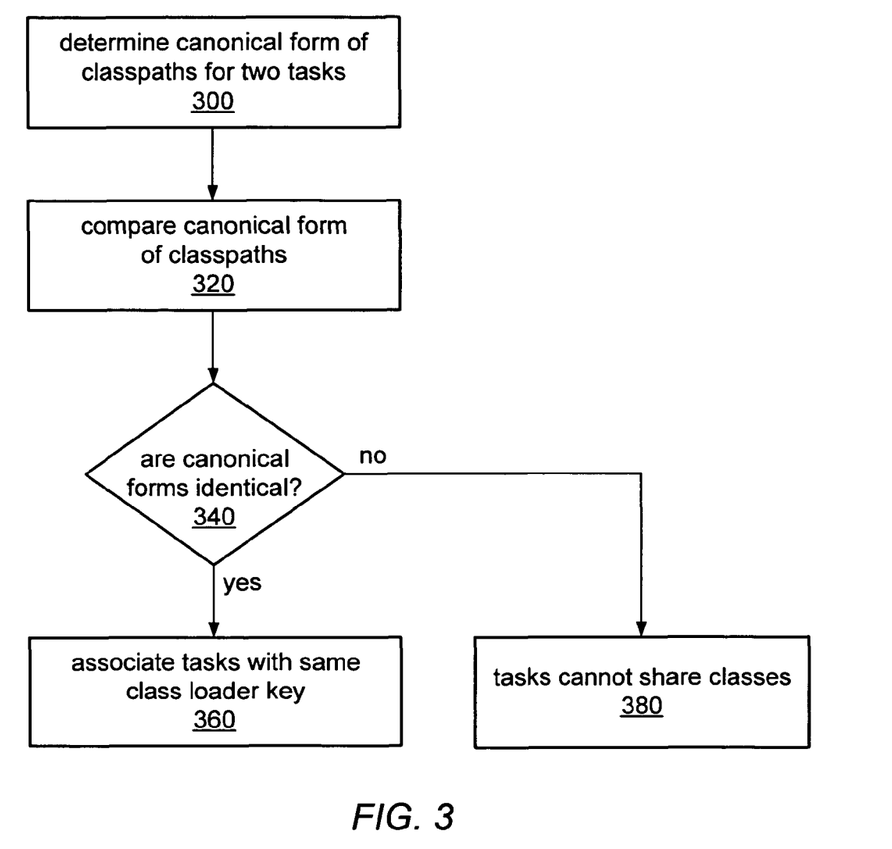
FIG. 3 is a flowchart illustrating one embodiment of a method for determining whether classpaths of two different tasks executing in the same virtual machine are the same and thus whether the two tasks can share runtime representations of classes.

FIG. 3 is a flowchart illustrating one embodiment of a method for determining whether classpaths of two different tasks executing in the same virtual machine are the same and thus whether the two tasks can share runtime representations of classes. As described above, allowing tasks to share runtime representations of classes may improve performance and reduce memory usage of a virtual machine. As part of sharing runtime representations of classes, the virtual machine may, in some embodiments, verify that the classpaths specified by two different tasks (or programs) are the same and thus that the class loaders of the respective tasks will behave identically when locating and loading classes according to the classpaths. In some embodiments, a virtual machine may be configured to determine whether two classpaths are the same by first determining a canonical form of each classpath, as indicated by block 300. In one embodiment, the virtual machine may determine a canonical form by utilizing one or more operating system functions or directives configured to expand a path including symbolic references (such as "." or "..") into an equivalent full path. For example, a "../classes" directory in a classpath may be expanded to "/development/classes". Additionally, any redundant directories in a classpath may be removed when determining or computing a canonical form. For instance, a classpath may include both "../lib/classes.jar" and "/development/lib/classes.jar", which when evaluated as full paths may both point to the same jar file. Thus, in some embodiments, the canonical form of such a classpath may only include a single instance of "/development/lib/classes.jar". Please note that symbolic references, such as "." and ".." may be evaluate according to the current directory of the relevant program or task.

A virtual machine may then compare the canonical forms of the classpaths, as indicated by block 320. In some embodiments, a virtual machine may perform a string or memory comparison on the canonical classpaths. In other embodiments, a Java virtual machine may be configured to perform pointer comparisons on canonical classpaths if the canonical classpaths are stored using Java interned string. As is known in the art, Java strings may be interned or shared. In general, there is only one copy of each String that has been interned, no matter how many references point to it. The process of converting duplicated strings to shared ones is called interning. Strings may then be compared using pointer comparison (i.e. using "==") instead of comparing each character of the strings. Thus, the exact method used to compare the two canonical forms of the classpaths may vary from embodiment to embodiment. If the canonical classpaths are identical, meaning that they both include exactly the same locations or directories for class files, as indicated by the positive output of block 340, the virtual machine may then associate the two tasks the same class loader key, as indicated by block 360. Two tasks associated with a single class loader key may allow the virtual machine to share runtime representations of classes between the two tasks, as described herein. While the use of class loader keys are described herein to indicate whether or not tasks may share runtime representations of classes, in other embodiments other ways of associating multiple programs or tasks with a shared runtime representation of classes may be utilized. In general any suitable method or data structure allowing the association of multiple tasks with shared runtime representations of classes may be utilized with various embodiments of the present invention.

If however, the canonical forms of the classpaths are not identical, as indicated by the negative output of block 340, the virtual machine may not associate the tasks with the same class loader key and therefore may not allow the two tasks to share runtime representations of classes, as indicated by block 380.

Figure 4:
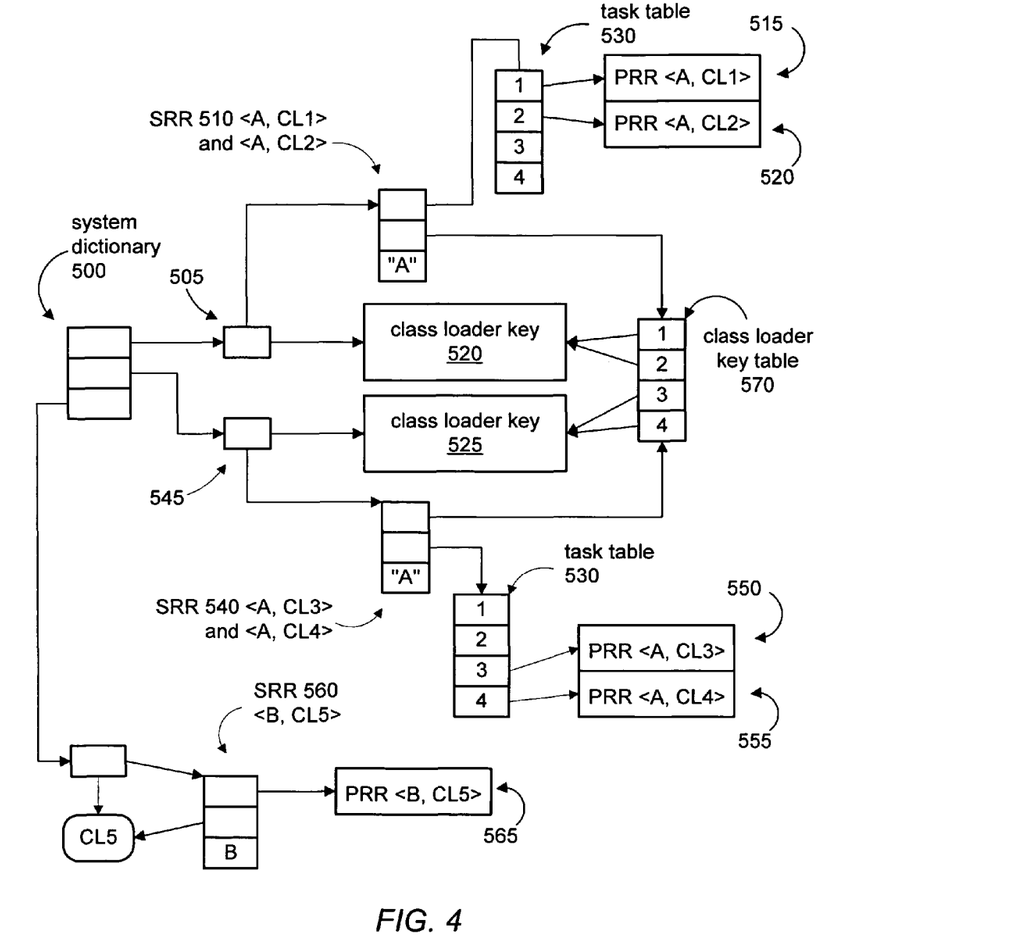
FIG. 4 is a block diagram illustrating exemplary data structures for supporting per-program classpaths and the sharing of runtime representations of classes in one embodiment.

FIG. 4 is a block diagram illustrating one embodiment of exemplary data structures that may be utilized by a multi-task virtual machine to implement per-program classpaths and class sharing. Please note that the structures and entities illustrated in FIG. 4 and described below represent only one possible embodiment of a design implementing per-program classpaths and that other embodiments may implement per-program classpaths using different data structures and that the specific design of data structures for implement per-program classpaths may vary from embodiment to embodiment.

As noted above, a runtime representation of a class may comprise three parts: a shared runtime representation (SRR), one or more private runtime representations, and a task table. In some embodiments, a task table may only be used for runtime representations that are shared by multiple task-reentrant class loaders and that may have more than one private runtime representation. Task tables, such as task table 530 in FIG. 4 may include one entry per task running in the system. Additionally, FIG. 4 includes five different class loader instances, indicated by CL1, CL2, CL3, CL4 and CL5. In the embodiment illustrated by FIG. 4, CL1, CL2, CL3 and CL4 represent task reentrant class loaders and therefore their respective tasks may share runtime representations of classes. CL5, however, represents a non-task reentrant class loader and thus its task may not share runtime representations of classes, as will be discussed in more detail below. Additionally, a virtual machine may include a class loader table 590, such as illustrated by FIG. 5 that identifies the various task-reentrant class loaders in the system and associates then with their respective tasks.

The shared runtime representation of a class may be associated with a class loader, such as by using a class loader identifier. The class loader identifier may indicate whether the class loader that defines the class is task reentrant and may be used to obtain a class loader key, in some embodiments. As described above, a class loader key may be used to group tasks that share runtime representations of classes. For instance, if two tasks specify identical classpaths, thus allowing them to share runtime representations of classes, those two tasks may be associated with the same class loader key.

In some embodiments, a multi-tasking virtual machine may maintain data structures, such as those illustrated in FIG. 4, that associate and maintain shared runtime representations of classes and that may allow the virtual machine to locate any particular shared runtime representations and its respective class loader. For example, a virtual machine may store with a shared runtime representation information or identifiers associating that shared runtime representation with the class loader that loaded (or defined) the particular class. Thus, virtual machine 120 may store SRR 510, which may represent the shared runtime representation of class A, as loaded by class loaders CL1 and CL2, indicated in FIG. 4 by the nomenclature "<A, CL1>" and "<A, CL2>". When loading class A via class loaders CL1 and CL2, virtual machine 120 may have determined that the respective tasks initiating the instances of class A specified identical classpaths and therefore only generated a single instance of shared runtime representation 510 while creating two different private runtime representations (one for each instance of class A), such as PRR 515 and 520 in FIG. 4.

Thus, in one embodiment, to access the private runtime representation of class A, such as PRR 515 for <A, CL1>, virtual machine 120 may first consult system dictionary 500, which maintains mappings between class names, class loader keys, and shared runtime representations: System dictionary 500 may include an entry, represented by block 505, that associates SRR 510 of class <A, CL1> with the name of class A and class loader key 520. In turn, SRR 510 may include a reference to task table 530. In one embodiment task table 530 includes one entry for every task and may also include references to the individual private runtime representations of classes for these tasks. Thus, by using the information stored with SRR 510 to locate task table 530, the task ID for the particular program whose class virtual machine 120 is attempting to locate may be used to index into task table 530 to locate the private runtime representation of class A, such as PRR 515. Thus, a task table may associate each task executing in the virtual machine with the particular private runtime representation of a particular class loaded by a particular type of class loader.

As discussed above, a class loader may be associated with a class loader identifier, in some embodiments. If a class loader is task reentrant, the class loader identifier may be a reference to a table of class loader keys. Thus, as described above, SRR 510 may include a class loader identifier that is really a reference to class loader key table 570. There may be one such table per type of task reentrant loader: one for the extension loader and one for the system loader. Tables of class loader keys have one entry per task running in a multi-tasking virtual machine. The multi-tasking virtual machine may also maintain a table of class loader objects per type of task reentrant loader (extension, system) with one entry per task. Thus, SRR 510 may include a reference to class loader key table 570 which may, in some embodiments, be used to aggregate those class loader keys associated with groups of programs or tasks that share runtime representations of classes.

In some embodiments, system loader key 570 may include one entry per task executing in the virtual machine and may associate each task with that task's associated class loader key. For instance, tasks 1 and 2 in the example illustrated by FIG. 4 are both associated with class loader key 520, thus indicating that tasks 1 and 2 share runtime representations of classes. Please note, that some embodiments may include a separate version of class loader key table 570 for each type of class loader. Thus, in one embodiment, virtual machine 120 may include one class loader key table for boot loaders, another for extension loaders and yet another for system (or application) loaders. Furthermore, class loader key table 570 represents only one possible embodiment of a mechanism for associating tasks, class loader keys and shared runtime representations.

Other embodiments may associate or link tasks with class loader keys and shared runtime representations using different data structures, mechanisms, and/or methods. For example, in some embodiments, SRR 510 and SRR 540 may directly reference their respective class loader keys (520 and 525) rather than referencing class loader key table 570. Having the shared runtime representation of a class directly reference a class loader key (rather than a class loader key table) may provide a direct and precise identification of which class loader key is associated with a particular shared runtime representation. However, having a shared runtime representation reference a class loader key table rather than directly referencing a class loader key may allow for more efficient identification of what type (i.e. boot, extension or system loader) is associated with that particular shared runtime representation. Thus, the particular implementation and data structures used to associate shared runtime representations, class loader keys and class loader key tables may vary from embodiment to embodiment.

In some embodiments, class loader keys tables may not be necessary for boot loaders because: 1) the primordial loader may be built-in to the virtual machine and thus there may be no need to maintain a per-task representation, and 2) when all boot loaders behave identically across all tasks executing in the virtual machine, the class loader key may have the same value across all tasks, hence a table of class loader keys may be unnecessary as well. In such embodiments, a null reference may be used for a class loader identifier for a boot loader. In other embodiments, however, it may be desirable to allow support for different behavior of the boot loader. For instance, one embodiment may allow end-users to alter the "bootstrap classpath", i.e. the path used by the boot loader to locate classes. To support such alterations, a multi-tasking virtual machine may use a table of class loader keys for the boot loader and may use references to this table as a class loader identifiers for those classes defined by boot class loaders.

FIG. 4 also illustrates another shared runtime representation of class A, SRR 540 that may represent the shared runtime representation of class A as loaded by class loaders CL3 and CL4. Thus, two other tasks may specify identical classpaths and thus may share a runtime representation of class A. However, the two tasks sharing SRR 510 may specify a different classpath that the two tasks sharing SRR 540. Thus, virtual machine 120, may, in one embodiment, maintain two separate sets of data structures for storing the different shared versions of class A. As described above regarding SRR 510, virtual machine 120 may maintain an entry 545 in system dictionary 500 that associates class loader key 525 with SRR 540 and the symbolic name of class A. SRR 540 may include a reference to task table 530, which in turn may include entries identifying the private runtime representations 550 and 555 of class A as loaded by class loaders CL3 and CL4, respectively.

In some embodiments, the same class defined by task-reentrant loaders of different tasks may have different runtime representations. However, all the runtime representations of the class may use the same class loader identifier. For clarification, consider classes <A, CL1>, <A, CL2>, <A, CL3>, and <A, CL4> in the example illustrated by FIG. 4. Class loaders CL1, CL2, CL3 and CL4 may be system loaders of four different tasks (tasks 1, 2, 3 and 4, respectively). Class loaders CL1 and CL2 may behave identically and therefore may use the same class loader key (class loader key 520) and share the same shared runtime representation of class A (SRR 510). Class loaders CL3 and CL4 may also behave identically and may have the same class loader key (class loader key 525) and may share the same shared runtime representation of class A (SRR 540). Please note, however, that CL3 and CL4 may not share the runtime representation for class A with CL1 and CL2 because CL1 and CL2 may behave differently from CL3 and CL4 and may therefore have defined class A from a different binary representation or may link class A to classes defined from different binary representations. In some embodiments, all shared runtime representations for class A defined by task-reentrant class loaders may use the same class loader identifier, namely, the reference to the table of class loader keys for system class loaders (class loader key 570).

As described above, classes defined by two virtual machine defined class loaders (as opposed to custom class loaders) may be shared between tasks associated with the class loaders if the two class loaders have identical class loader keys, indicating that the two class loaders behave identically with respective to the locating and loading of classes. In some embodiments, extension loaders of two classes may have the same class loader key if they are associated with the same canonical list of directories used to locate binary representation of classes. In one embodiment, the directories associated with extension loaders may be referred to as "extension directories" or as an "extension classpath". System loaders of two tasks may have the same class loader key if they are associated with the same canonical classpath and if the extension loaders to which they delegate class loading also have the same class loader key. In other words, if the system loaders of two tasks have identical canonical classpaths and the extension loaders to which the system loaders delegate also have the identical "extension" classpaths, the two system loaders may be associated with the same class loader key. Please note, if two system loaders are associated with identical classpaths but do not delegate to extension loaders that have identical "extension" classpaths, the two system loaders may not have the same class loader key and thus runtime representations of classes loaded by those system class loader may not be shared.

FIG. 4 also includes a runtime representation of class B as loaded by class loader CL5, which may not be task-reentrant and thus the task loading class B may not share runtime representation of class B with other tasks. For instance, class loader CL5 may be a custom class loader unique to the task loading class B and not defined by the virtual machine. As with class A, system dictionary 500 may include an entry associating the symbolic name of class B with the runtime representation of class B and the class loader loading class B. However, if a class loader isn't task-reentrant, such as class loader CL5, the runtime representation of a class loaded by that class loader may not include a reference to a class loader key table 570, but instead may simply include a reference to the actual object instance representing the class loader. Since tasks implementing non task-reentrant class loader do not share runtime representations with other tasks, there may not be any need for the use of class loader keys and class loader key tables.

Thus, virtual machine 120 may, in some embodiments, break the runtime representation of class B into two portions that match those portions separated into shared and private runtime representations for shared class runtime representations. In other words, virtual machine 120 may include those portions of an instance of class B that would be shared if class B were sharable in one structure and store those portions that would not be shared in another structure. For instance, in FIG. 4, the runtime representation of class B is split between SRR 560 and PRR 565 even through SRR 560 may not be shared with other tasks. In some embodiments, maintaining the shared and private runtime representations of class even for classes that are not shared may simplify the logic needed to access any particular instance of a class. Thus, instead of requiring any instruction that accesses a portion of a runtime representation of a class (as may be required for accessing any and every member variable or function of a class) to determine whether the class being accessed is shared or not, the runtime representation of all classes may be accessed using identical methodologies and logic regardless of whether the individual class being accessed is shared or not, according to some embodiments.

FIG. 6 is a flowchart illustrating one embodiment of a method for loading a class in a virtual machine supporting per-program classpaths and sharing of runtime representation of class. When a program or task specifies a new instance of a class, as indicated by block 600, a multi-tasking virtual machine may consult a system directory to determine whether any runtime representations of the requested class are already loaded in the system, as indicated by block 620. In some embodiments, a system dictionary may associate class names with particular class loaders or class loader keys and with particular runtime representations (either shared or not) of instances of that class. Thus, as noted above, the virtual machine may search the entries of a system directory to locate a previously loaded shared runtime representation of the requested class that may also be shared by the program or task specifying or requesting the new instance of the class. If, as indicated by the positive output of block 640, the system dictionary includes an entry associating the class name and the class loader key of the relevant task with a shared runtime representation of the class, the virtual machine may then generate a new private runtime representation (PRR) for the new instance of the class and associate the PRR with the shared runtime representation identified in the system dictionary, as indicated by block 670. As noted above, while multiple programs or classes may share portions of a single class, they each may need their own versions or instances of certain portions of the class, such as static variables, etc. Thus, even if a shared runtime representation of a class already exists in the virtual machine that may be shared by the task initiating the new instance of the class, the virtual machine may still generate a private runtime representation of portions of the class that cannot be shared.

If, however, the system dictionary does not currently include an entry for the particular class and the class loader defining the class (such as may be indicated by a class loader key), as indicated by the negative output of block 640, the virtual machine may, according to some embodiments, determine whether or not the class loader defining the new class is a task-reentrant class loader, as indicated by decision block 650. If, as indicated by the positive output of block 650, the class loader defining the new class is a task-reentrant class loader (i.e., a virtual machine defined class loader associated with a class path identical to the class path of other virtual machine defined class loader of other tasks or program), the virtual machine may generate a new shared runtime representation for the class as indicated by block 660. Additionally, the virtual machine may associate the shared runtime representation of the new class with the appropriate class loader key and may also update the system dictionary to associate the class name with the class loader key and the newly generated shared runtime representation. After generating a new shared runtime representation of the new class instance, the virtual machine also generate a private runtime representation for those portions of the class that cannot be shared by multiple programs or tasks, as indicated by block 670 and described above.

If, as indicated by the negative output of block 650, the class loader is not task-reentrant, such as because the class loader is a custom class loader not controlled by the virtual machine, the virtual machine may generate a non-sharable runtime representation of the class, as indicated by block 680. In some embodiments, the virtual machine may generate separate runtime representation portions of the new class similar to shared and private runtime representations even if the runtime representation of the class cannot be shared to allow the non-shared and the shared runtime representations of the classes to be accessed using identical methods. For example, when generating a non-shared runtime representation of a class, a virtual machine may generate a portion of the runtime representation that includes those portions of the class that would have been included in a shared runtime representation and may also generate another runtime representation including that portions that otherwise would have been included in a private runtime representation of the class, if the runtime representation of the class were sharable.

Figure 7:
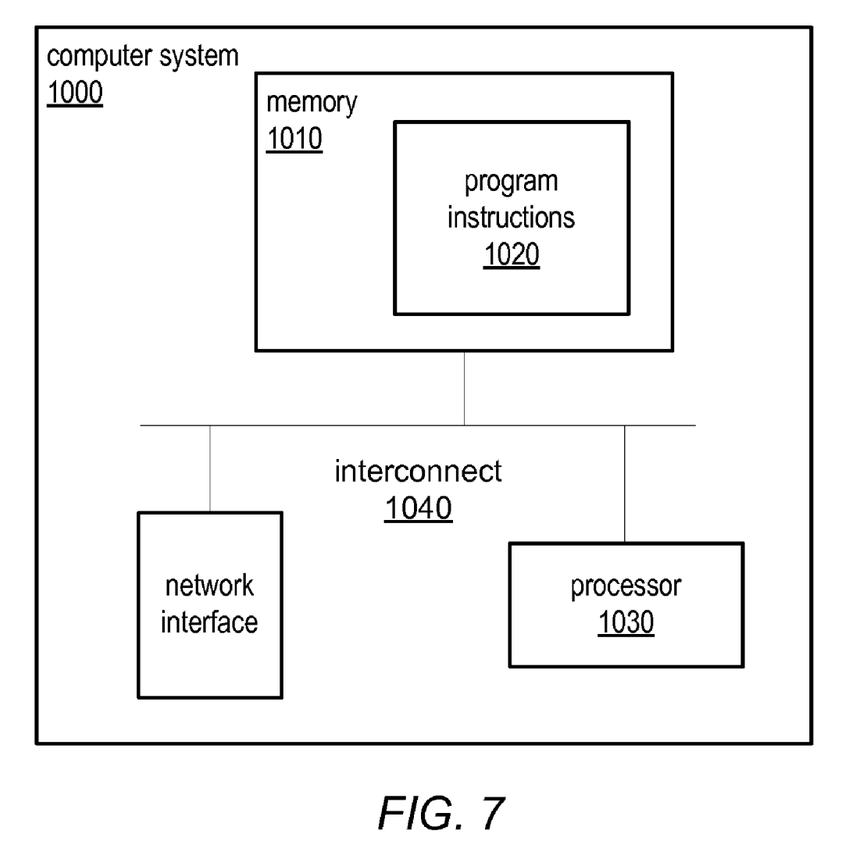
FIG. 7 is a block diagram, according to one embodiment, of a computing system capable of implementing a multi-tasking virtual machine that supports per-program classpaths and sharing of runtime representations of classes.

FIG. 7 illustrates a computing system capable of implementing a multi-tasking virtual machine that supports per-program classpaths and sharing of runtime representations of classes, as described herein and according to various embodiments. Computer system 1000 and system 100, described above, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to implement a virtual machine.

Computer system 1000 may include at least one processor 1030. Processor 1030 may couple across interconnect 1040 to memory 1010. Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions 1020 configured to implement a multi-tasking virtual machine support per-program classpaths and sharing of runtime representations of classes, as described herein. In certain embodiments memory 1010 may include program instructions configured to implement a multi-tasking virtual machine, such as virtual machine 120. A multi-tasking virtual machine may be implemented in any of various programming languages or methods. For example, in one embodiment, virtual machine 120 may be JAVA based, while in another embodiments, virtual machine 120 may be written using another programming language such as the C# or C++ programming languages.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method for supporting per-task classpaths with class sharing in a multi-tasking virtual machine, comprising:
    executing a plurality of tasks in a multi-tasking virtual machine (VM);
    determining that a VM-defined class loader for a first task of the plurality of tasks and a VM-defined class loader for a second task of the plurality of tasks specify the same class definition for a given class name, wherein the VM-defined class loaders are of the same type, wherein, in said determining, a first identical class loader key defined from a classpath used by the VM-defined class loaders of the first and second tasks for locating the class definition is determined to have been associated with each of the first and second tasks;
    in response to said determining that the VM-defined class loader for the first task and the VM-defined class loader for the second task specify the same class definition for the given class name,
        sharing, between the first and second tasks, a runtime representation of at least a portion of the class as defined by the class definition specified by the VM-defined class loaders of the first and second tasks and corresponding to the given class name, wherein the shared runtime representation is generated within the multi-tasking virtual machine according to the class definition specified by the VM-defined class loaders of the first and second tasks, and wherein the shared runtime representation is specified by the first identical class loader key associated with the first and second tasks;
    wherein respective VM-defined class loaders for at least two of the plurality of tasks other than the first and second tasks each specifies a second class definition for the given class name that is not the same class definition specified by the VM-defined class loaders of the first and second tasks, wherein the at least two other tasks share a runtime representation of at least a portion of a class as defined by the second class definition, and wherein the runtime representation shared by the at least two other tasks is specified by a second identical class loader key associated with the at least two other tasks; and wherein the runtime representation shared by the first and second tasks and the runtime representation shared by the at least two other tasks coexist within the multi-tasking virtual machine for a period of time.

2. The method of claim 1, wherein associating the first identical class loader key includes computing a class loader key for the VM-defined class loaders of the first and second task comprising:

if the VM-defined class loader for the first task and the VM-defined class loader for the second task are extension loaders: computing the class loader key for each of the VM-defined class loaders as a canonical form of a respective list of extension directories associated with each VM-defined class loader; and if the VM-defined class loader for the first task and the VM-defined class loader for the second task are system loaders that each delegate class loading to respective extension class loaders: computing the class loader key for each of the VM-defined class loaders as a concatenation of a class loader key of the respective extension class loader to which the respective system class loader delegates and a canonical form of a respective list of system directories associated with each system class loader; and wherein said determining comprises comparing the respective class loader keys.

3. The method of claim 1, further comprising maintaining a system dictionary comprising the identical class loader keys indicating an association between each respective task, the respective VM-defined class loader, and the respective shared runtime representation.

4. The method of claim 3, further comprising resolving symbolic references to classes specified by VM-defined class loaders for plurality of tasks according to the system dictionary.

5. The method of claim 1, further comprising:

generating a respective private runtime representation of a portion of the class as defined by the respective class definition for each of the tasks, wherein the respective private runtime representations are not shared between the tasks; and associating each respective private runtime representation with the corresponding task and the respective shared runtime representation.

6. A method for supporting per-task classpaths with class sharing in a multi-tasking virtual machine, comprising:

executing a first task and a second task in a multi-tasking virtual machine (VM), wherein each task executing in the VM specifies a classpath for locating class definitions;

determining and recording that the first task and the second task are able to share classes, wherein two or more classes are determined as able to share classes if the respective classpaths specified by the two or more tasks indicate identical locations for locating class definitions; and sharing a runtime representation of a sharable portion of a class between the first task and the second task in response to determining that the first and second tasks are recorded as able to share classes when respective VM-defined class loaders for each of the first task and the second task load the class, and wherein the runtime representation of the sharable portion of the class is generated within the multi-tasking virtual machine according to a class definition at a location indicated by the classpaths of the first and second tasks;

wherein at least two tasks executing in the multi-tasking virtual machine other than the first and second tasks specify respective classpaths that indicate identical locations for locating class definitions, wherein the locations indicated by the classpaths of the at least two other tasks are different than the locations indicated by the classpaths of the first and second tasks, and wherein the at least two other tasks share a runtime representation of the sharable portion of the class generated within the multi-tasking virtual machine according to a class definition for the class at a location indicated by the classpaths specified by the at least two other tasks; and wherein the runtime representation shared by the first and second tasks and the runtime representation shared by the at least two other tasks coexist within the multi-tasking virtual machine for a period of time.

7. The method of claim 6, wherein said determining that the first task and the second task are able share classes comprises comparing canonical forms of each respective classpath.

8. The method of claim 6, further comprising associating the first task and the second task with the runtime representation shared between the first task and the second task and with a respective VM-defined class loader that generates the runtime representation shared between the first task and the second task from an on-disk representation of the respective class.

9. The method of claim 8, wherein said associating further comprises maintaining a system dictionary indicating the association between each task and the runtime representation shared between the tasks and the association between each task and the respective VM-defined class loader.

10. The method of claim 6, further comprising:

generating a respective private runtime representation of a non-sharable portion of the class for each of the first task and the second task, where the respective private runtime representations are not shared between the first task and the second task; and associating each respective private runtime representation with the corresponding task and with the runtime representation shared between the first task and the second task.

11. The method of claim 6, further comprising determining and recording that a third task executing in the multi-tasking virtual machine is not able to share classes with the first and second tasks or with the at least two other tasks.

12. The method of claim 11, further comprising:

in response to determining that the third task is recorded as not able to share classes with the other tasks, generating a separate runtime representation of the sharable portion of the class within the multi-tasking virtual machine according to a class definition at a location indicated by the classpath of the third task; and associating the separate runtime representation of the sharable portion of the class with the third task.

13. The method of claim 12, further comprising:

determining and recording that a fourth task is able to share classes with the third task; and in response to determining that the fourth task is recorded as able to share classes with the third class, sharing the separate runtime representation between the third task and the fourth task.

14. A system, comprising:
a processor; and
a memory coupled to the processor, wherein the memory comprises program instructions configured to implement a multi-tasking virtual machine supporting per-program classpaths with class sharing, wherein the virtual machine is configured to:
- execute first and second programs, where each of the first and second programs includes a respective classpath specifying one or more locations for locating class definitions for classes of the respective program;
- determine and record that the first and second programs are able to share classes, wherein two or more programs are determined as able to share classes if the respective classpaths of the two or more programs specify identical locations for locating class definitions; and
- share a runtime representation of at least a portion of a class between the first and second programs in response to a determination that the first and second programs are recorded as able to share classes when respective VM-defined class loaders of each of the first and second programs load the class, and wherein the runtime representation of the at least a portion of the class is generated within the multi-tasking virtual machine according to a class definition at a location specified by the classpaths of the first and second programs;

wherein at least two programs executing in the multi-tasking virtual machine other than the first and second programs include respective classpaths that specify identical locations for locating class definitions, wherein the locations specified by the classpaths of the at least two other programs are different than the locations specified by the classpaths of the first and second programs, and wherein the at least two other programs share a runtime representation of the sharable portion of the class generated within the multi-tasking virtual machine according to a class definition for the class at a location indicated by the classpaths of the at least two other programs; and wherein the runtime representation shared by the first and second programs and the runtime representation shared by the at least two other programs coexist within the multi-tasking virtual machine for a period of time.

15. The system of claim 14, wherein to determine that the first program and the second program are able share classes, the virtual machine is further configured to compare canonical forms of each respective classpath.

16. The system of claim 14, wherein the virtual machine is further configured to associate the first and second programs with the runtime representation shared between the first and second programs and with a respective VM-defined class loader, wherein the respective VM-defined class loader associated with each program is configured to generate the runtime representation shared between the first and second programs from an on-disk representation of the respective class.

17. The system of claim 16, wherein, to associate the first and second programs with the runtime representation shared between the first and second programs, the virtual machine is further configured to maintain a system dictionary indicating the association between each program and the runtime representation and the respective VM-defined class loader.

18. The system of claim 14, wherein the virtual machine is further configured to:
- generate a respective private runtime representation of a non-sharable portion of the class for each of the first and second programs, where the respective private runtime representations are not shared between the first and second programs; and
- associate each respective private runtime representation with the corresponding program and with the runtime representation shared between the first and second programs.

19. The system of claim 14, wherein the virtual machine is further configured to:
- determine and record that a third program executing in the multi-tasking virtual machine is not able to share classes with the first and second programs or with the at least two other programs 20. The system of claim 19, wherein the virtual machine is further configured to:
- generate a separate runtime representation of at least a portion of the class within the multi-tasking virtual machine according to a class definition at a location specified by the classpath of the third program in response to a determination that the third program is recorded as not able to share classes with the other programs; and
- associate the separate runtime representation of the at least a portion of the class with the third program.

* * * * *